United States Patent
Schloss et al.

[11] Patent Number: 5,851,471
[45] Date of Patent: Dec. 22, 1998

[54] METHOD FOR INJECTION MOLDING A MULTI-LAYER PREFORM FOR USE IN BLOW MOLDING A PLASTIC BOTTLE

[75] Inventors: Francis M. Schloss, Perrysburg; Dennis C. Balduff, Whitehouse, both of Ohio

[73] Assignee: The Coca-Cola Company, Atlanta, Ga.

[21] Appl. No.: 648,669

[22] Filed: May 16, 1996

[51] Int. Cl.⁶ .................. B29B 11/08; B29C 45/16
[52] U.S. Cl. ............ 264/250; 264/279; 264/328.8; 264/513
[58] Field of Search .................. 264/255, 279, 264/328.8, 537, 513, 250; 425/130; 428/35.7, 36.6, 36.7, 542.8

[56] References Cited

U.S. PATENT DOCUMENTS

| | | | |
|---|---|---|---|
| 3,733,309 | 5/1973 | Wyeth et al. .................. 260/75 T |
| 3,787,157 | 1/1974 | Valyi . | |
| 3,804,663 | 4/1974 | Clark .................. 117/101 |
| 3,878,282 | 4/1975 | Bonis et al. .................. 264/97 |
| 4,069,933 | 1/1978 | Newing .................. 215/1 C |
| 4,403,706 | 9/1983 | Mahajan .................. 215/1 C |
| 4,501,781 | 2/1985 | Kushida et al. .................. 428/35 |
| 4,550,043 | 10/1985 | Beck .................. 428/36 |
| 4,575,915 | 3/1986 | Clark et al. .................. 29/509 |
| 4,606,942 | 8/1986 | Shriver et al. .................. 427/233 |
| 4,609,516 | 9/1986 | Krishnakumar et al. .................. 264/255 |
| 4,710,118 | 12/1987 | Krishnakumar et al. .................. 425/130 |
| 4,725,464 | 2/1988 | Collette .................. 428/35 |
| 4,746,538 | 5/1988 | Mackowski .................. 427/38 |
| 4,892,392 | 1/1990 | Broer .................. 350/339 R |
| 4,910,054 | 3/1990 | Collette et al. .................. 428/35.7 |
| 4,923,723 | 5/1990 | Collette et al. .................. 428/35.7 |
| 4,944,576 | 7/1990 | Lacker et al. .................. 350/334 |
| 4,950,143 | 8/1990 | Krishnakumar et al. .................. 425/130 |
| 4,954,376 | 9/1990 | Krishnakumar et al. .................. 428/35.7 |
| 4,966,543 | 10/1990 | Krishnakumae et al. .................. 425/522 |
| 5,024,850 | 6/1991 | Broer et al. .................. 428/1 |
| 5,032,341 | 7/1991 | Krishnakumar et al. .................. 264/255 |
| 5,049,345 | 9/1991 | Collette et al. .................. 264/255 |
| 5,112,212 | 5/1992 | Akselrud .................. 425/557 |
| 5,116,565 | 5/1992 | Yoshino .................. 264/532 |
| 5,143,733 | 9/1992 | Von Buren et al. .................. 425/130 |
| 5,200,207 | 4/1993 | Akselrud et al. .................. 425/557 |
| 5,599,494 | 2/1997 | Marcus .................. 264/513 |
| 5,645,865 | 7/1997 | Schad et al. .................. 425/126.1 |
| 5,668,570 | 9/1997 | Ruttinger, Sr. .................. 428/35.7 |

FOREIGN PATENT DOCUMENTS

WO95/00325   1/1995   WIPO .

*Primary Examiner*—Catherine Timm
*Assistant Examiner*—Suzanne E. Mason
*Attorney, Agent, or Firm*—Birch, Stewart, Kolasch & Birch, LLP

[57] ABSTRACT

A method of injection molding a multi-layer preform from a combination of virgin and recycled plastic such as PET so that the resultant blow-molded bottle has a reduced tendency for bottom failure in spite of the use of recycled plastic. A first plastic preform for providing the inner layer of the multi-layer preform is provided with spaced channels on the exterior surface of a closed end thereof extending from a central region of that end to the sidewalls. An injection mold cavity is provided with a like plurality of channels formed therein in a closed end thereof communicating with the injection gate of an injection molding apparatus. The first plastic preform is inserted into the injection mold cavity with the respective channels of the preform and the injection mold cavity substantially aligned. A second layer of plastic material is overmolded onto the first layer by injection molding in the cavity. A third layer of plastic material may be overmolded on the second layer to form a three-layer preform. Preferably the first and third layers are formed from virgin plastic and the second layer is formed from recycled plastic.

14 Claims, 2 Drawing Sheets

METHOD FOR INJECTION MOLDING A MULTI-LAYER PREFORM FOR USE IN BLOW MOLDING A PLASTIC BOTTLE

BACKGROUND OF THE INVENTION

The present invention relates to a method of injection molding an improved multi-layer preform for use in blow molding a container such as a beverage bottle having a bottom with improved structural strength and durability.

More specifically, the present invention relates to a method of injection molding a multi-layer preform from a combination of virgin and recycled plastic such as PET so that the resultant blow molded bottle has a reduced tendency for bottom failure in spite of the use of the recycled plastic.

It is desirable to be able to fabricate multi-layer plastic beverage bottles from the combination of virgin and recycled plastics, such as PET. Ideally recycled PET comprises a central layer of a three-layer bottle structure wherein the inner and outer layers both comprise a higher grade of more expensive virgin PET, so that neither the beverage in the bottle nor the consumer comes into direct contact with the recycled plastic (PET).

Typically the quality and strength of plastic is measured by its intrinsic viscosity (IV). For example, blow molded plastic PET bottles are generally fabricated from virgin PET having an IV from about 0.70 to about 0.86 dl/g. On the other hand recycled PET generally has an IV less than 0.74 and from about 0.63 to 0.72.

The lower intrinsic viscosity, recycled PET, is less durable than the higher IV, virgin PET. Therefore, it is subject to a higher probability of creep, stress cracking, impact failure, burst failure or cracking from various other causes. This problem is particularly acute in the bottom region of the bottle which is subject to more wear and tear.

In stretch blow molding plastic containers, a preform is typically injection molded and thereafter internally pressurized within a blow mold in order to form a bottle. The sidewalls or body of the preform are materially expanded during the blow molding process causing biaxial orientation of the plastic and increase strength. However, the bottom region of the preform is not materially expanded to the same extent and, therefore, does not undergo biaxial orientation to any significant degree that will result in increased strength. Therefore, regardless of the type of material utilized, the bottom region of the bottle is inherently weaker than the sidewall regions forming the body.

Accordingly, a need in the art exists for a method to minimize the quantity or effect of the use of recycled plastics such as PET in the bottom of a multi-layer beverage bottle since this bottom region is already inherently less durable due to the lack of biaxial orientation from the stretch blow molding process.

SUMMARY OF THE INVENTION

Accordingly, it is a primary object of the present invention to provide a method for injection molding a multi-layer preform for use in blow molding a beverage bottle which minimizes the quantity and thickness of recycled PET, or low IV plastic, in the bottom of the preform in order to increase the strength and durability of the bottom of the bottle.

It is a further object of the present invention to provide a method for injection molding a multi-layer preform for blow molding beverage bottles including at least one injection molded layer of recycled plastic material, or a low IV plastic, as compared to the IV of the plastic of the remaining layers.

It is another object of the present invention to provide an improved method of making a blow molded container which has a bottom region with a reduced probability to incur stress cracking, impact failure, burst failure and other structural failures.

It is yet another object of the present invention to provide a method for making a preform and resultant blow molded beverage bottle with a multi-layer structure which is cheaper due to the partial use of recyclable plastic materials.

It is still a further object of the present invention to provide an improved method for making a beverage bottle which encourages recycling of plastic materials, and thus benefits the environment.

It is still another object of the present invention to provide a method of injection molding at least one layer of a multi-layer preform from recyclable plastics, or low IV plastics, onto a layer of higher IV plastic, while still achieving a bottom structure in a resultant blow molded container of high strength and durability.

It is still another object of the present invention to provide an improved structure for a multi-layer preform including at least one layer of recyclable or low IV plastic material.

It is still another object of the present invention to provide a method of injection molding at least one layer of a multi-layer preform from other polyester materials, or other injection moldable barrier plastics, onto a layer of polyester such as PET, while still achieving a blow molded beverage bottle offering improved barrier properties.

The objects of the present invention are fulfilled by providing a method for injection molding a multi-layer preform for use in blow molding a plastic bottle, comprising the steps of:

forming an inner layer of a plastic preform having an open end, sidewalls, and a closed end, said closed end having a plurality of spaced channels on the exterior surface thereof extending from a central area on the closed end to the sidewalls;

providing an injection mold cavity defined by sidewalls, an open end for accommodating a core rod, and a closed end with an injection gate therethrough, and a plurality of channels on the interior surface of the closed end communicating with the gate and extending from the gate to the sidewalls;

inserting the plastic preform comprising the inner layer of the preform into said injection mold cavity with respective channels of the preform and the injection mold cavity substantially aligned; and overmolding a second layer of plastic material on the preform in said injection mold cavity.

It should be understood in accordance with the present invention that the preform may be either a single or multi-layer structure formed from the injection techniques of the present invention.

Preferably the preform is a multi-layer structure with the inner layer formed from plastic with a higher intrinsic viscosity (IV) than a second layer of plastic overmolded thereon. For example, the inner layer may comprise virgin plastic and the second overmolded layer recycled plastic.

With a three-layer structure a third overmolded layer may be provided of the same or similar plastic to the high IV inner layer of virgin plastic.

Each of the plastic layers in a preferred embodiment comprise PET but other types of plastics could be utilized within the scope of the present invention. For example for "hot fill" applications, plastics with high temperature softening resistance (Tg) could be utilized. Polyesters with high Tg values for example may comprise polyethylene naphthalate (PEN) or its copolymers or blends. Other nonpolyester materials may also be utilized for one or more of the layers such as acrylonitrile, styrene, polyamides, acrylonitrile copolymers, polycarbonate, polyolefins etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

Figure 1:
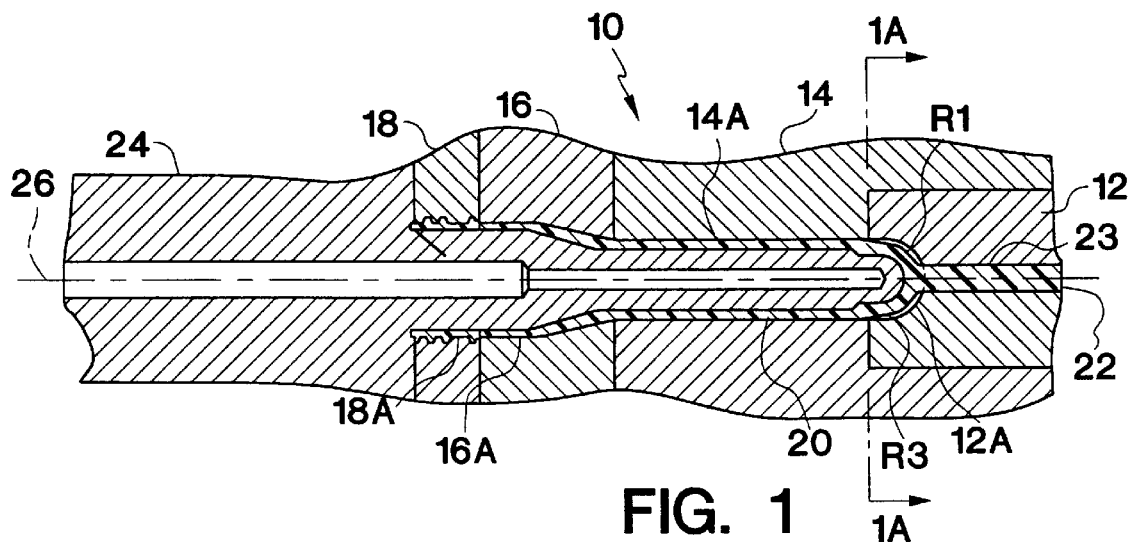
FIG. 1 is a cross-sectional view of an injection mold cavity depicting in side elevation the formation of an injection molded preform of a single layer to form the base of the preform of the present invention.
Figure 1A:
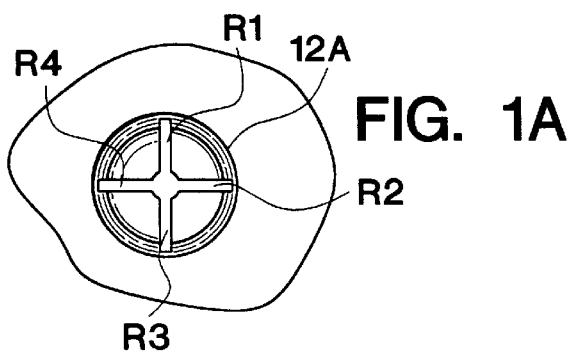
FIG. 1A is a full end elevational view taken along line 1A—1A of FIG. 1.

A multi-layer preform of the present invention may be provided by performing a series of injection molding steps as illustrated in FIGS. 1 to 5 of the drawings. FIG. 1 illustrates a mold 10 disposed on a longitudinal axis 26 including an end cap 12 including a gate 22 extending therethrough and a closed end configuration 12A defining the closed end of the female mold cavity. End 12A includes a plurality of ribs R1–R4 (FIG. 1A) for forming channels C1 to C4 in the end 20E of a preform 20 to be described further hereinafter with-respect to FIGS. 2 and 2A.

A body cavity of the mold 10 is formed by a block 14 having sidewall portions 14A to form the sidewalls (body portion) of the preform 20. Adjacent to the body cavity block 14 is a transition block 16 for forming a transition portion 16A of the mold cavity between the body 14A and a threaded neck configuration 18A formed by a thread split block 18. A core rod 24 is movably supported on axis 26 and fits within the mold cavity for supporting and forming the interior surface of the preform 20. Once the injection molding step is completed in the mold cavity 10 of FIG. 1 the core rod 24 is removed with the molded preform 20 thereon. The sprue 23 is then removed and the preform takes the shape illustrated in FIG. 2.

Figure 3:
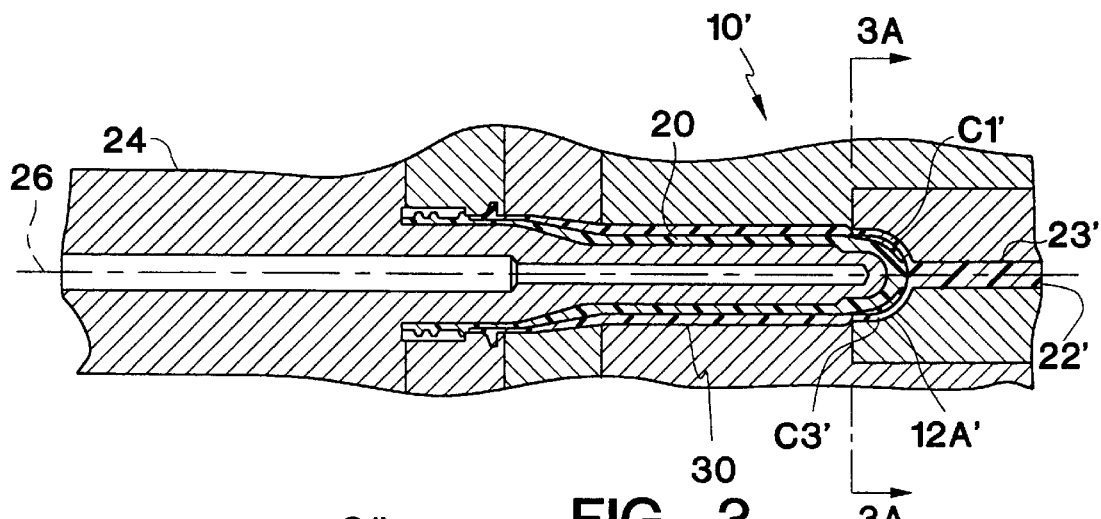
FIG. 3 is a cross-sectional view of a second injection mold cavity illustrating the overmolding of a second layer of plastic onto the preform of FIG. 2 in accordance with the present invention in order to achieve a two-layer preform.

The cold runner mold design illustrated in FIGS. 1 and 3, which produces a sprue 23 or 23' on the molded part, is not essential to the practice of the invention, and other mold designs, such as a hot runner mold employing a mechanical gate or thermal shut-off could be used instead. With such a mold, a sprue would not be produced.

Figure 2:
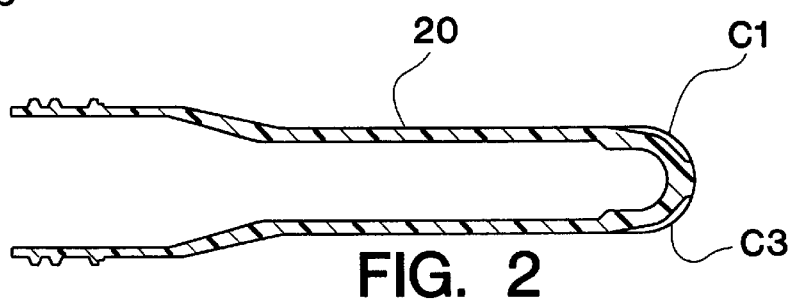
FIG. 2 is a partial cross-sectional view in side elevation of the preform molded in the cavity of FIG. 1.
Figure 2A:
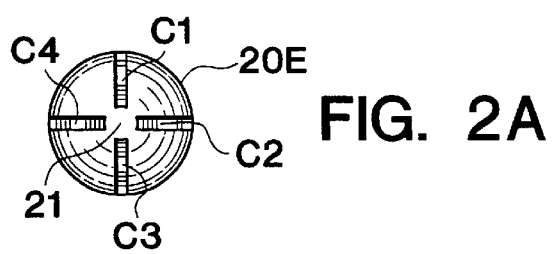
FIG. 2A is an end elevational view of the preform of FIG. 2 illustrating a plurality of equally spaced channels molded therein.

As illustrated in FIG. 2A the preform 20 and its closed end 20E has a plurality of equally spaced channels C1 to C4 molded therein. These channels C1 to C4 extend from a central region 21 aligned with gate 22 while in the mold 10 and extend to the sidewalls 14A. As will be explained more fully hereinafter, these channels C1 to C4 provide flow paths for plastic material injected in an overmolding process, such as in the injection mold of FIG. 3, in order to minimize the amount of overmolded plastic material in the end region 20E of the preform.

Referring to FIG. 3 there is illustrated an overmolding process of the preform 20 formed in the mold cavity 10 of FIG. 1. The core rod of the FIG. 1 mold is inserted into the mold cavity 10' of FIG. 3 with the preform 20 thereon and a second layer of plastic is injected through the gate 22' into the end cap 23' to overmold a second layer 30 of plastic onto preform 20. The closed end 12A' of the female mold cavity in FIG. 3 has a plurality of spaced channels (shown in FIG. 3A) in alignment with channels C1' to C4' in the end of preform 20. The respective sets of channels in the closed end of preform 20, and in the closed end 12A', provide flow paths for the plastic along radial directions to the sidewalls of the preform. The size of the respective channels are selected to provide laminar flow of this plastic from the gate of the sidewalls.

Figure 4A:
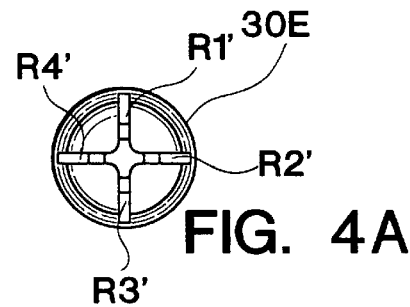
FIG. 4A is an end elevational view of the preform of FIG. 4 illustrating a plurality of equally spaced ribs thereon.
Figure 4:
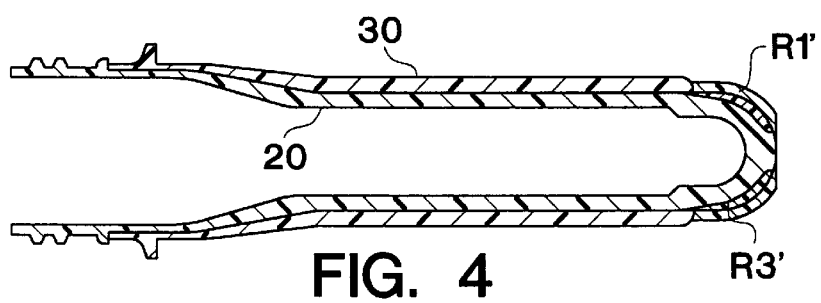
FIG. 4 is a partial cross-sectional view of the two layer preform molded in the mold of FIG. 3.
Figure 5:
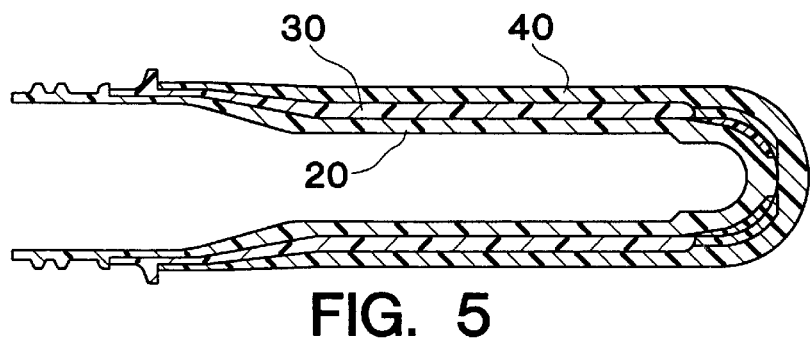
FIG. 5 is a cross-sectional view of a preform having a third layer of plastic molded onto the preform of FIG. 5 in accordance with an additional embodiment of the present invention.

The resultant two layer preform of the injection molding process within the mold cavity 10' of FIG. 3 results in the two layer preform structure illustrated in FIG. 4. This includes an inner plastic layer 20 and an outer layer 30 overmolded thereon. The end configuration of the preform as illustrated in FIG. 4A includes a plurality of equally spaced ribs R1' to R4' on the closed end 30E of the preform. These ribs are formed from the same plastic material as the layer 30, and are separated by sectors of plastic which are made up of only the plastic in layer 20. Thus, the majority of the material which forms the end of the preform is the material from the inner layer of preform 20.

In accordance with the present invention the inner plastic layer 20 of the preform comprises a virgin plastic, such as virgin PET, and the overmolded plastic layer 30 comprises a recycled plastic, such as recycled PET. However, it can be seen that the only portion of the two layer preform in the end region 30E of the two layer structure, that is formed from the recycled plastic, are the ribs R1'–R4'. Thus, the amount of recycled plastic material in the end structure of the preform is minimized. Consequently, the multi-layer preform bottom structure has an improved structural strength and durability since the majority of the material which makes up the bottom structure is the higher quality plastic material in layer 20.

In an additional embodiment of the present invention a third layer of virgin plastic, such as PET, can be overmolded onto the composite structure of the preform of FIG. 4 to form a three-layer plastic preform. As illustrated the recycled plastic in layer 30 is sandwiched between inner layer 20 and outer layer 40 of virgin plastic so that a resultant bottle blow molded from the preform of FIG. 5 will present only virgin plastic surfaces to the product contained within the container and the consumer, respectively.

Figure 3A:
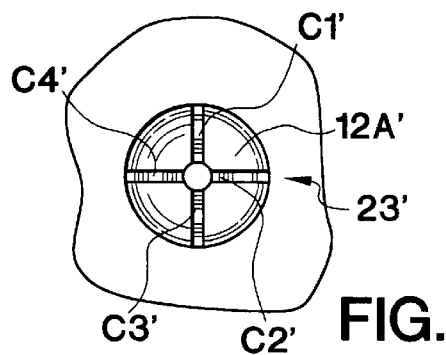
FIG. 3A is a full end elevational view taken along lines 3A—3A in FIG. 3.

Accordingly the preforms made in accordance with the methods of the present invention are designed to limit the amount of the average thickness of the recycled (low IV PET) 30 in the base of the preform since stress cracking and other forms of cracking are known to be a problem in the base area of the PET bottle, and since low IV PET resin is known to be more susceptible to cracking than is higher (virgin) IV PET. The inner preform 20 is designed as illustrated in FIG. 2A such that a series of channels C1 to C4 are formed in the base 20E of the preform and are positioned to connect the entry point of the melted resin at gate 22 to the body or sidewalls of the preform layer 20. When the inner preform layer 20 containing the molded-in channels C1 to C4 in the base area 20E are positioned into the mold of FIG. 3 for overmolding of the second layer of recycled PET 30, the inner preform layer 20 and its respective channels C1 to C4 are aligned with the channels C1' to C4' in the end of the female mold cavity of FIG. 3A. The female mold cavity of FIG. 3 in the portion 12A' has equivalent channels C1' to C4' cut into the base area in the overmolding female cavity as shown in FIG. 3A. This arrangement of channels C1 to C4 molded into the inner preform base 20E, which are then aligned with similar channels C1' to C4' in the overmolded base area 12A' of the mold 10' of FIG. 3, provide closed channels during the second overmolding step that are large enough in cross-sectional area to allow rapid laminar flow of the second injection shot of recycled PET up through the channels and into the body portion 12A' of the preform cavity. This approach allows the molding of a two-layer preform as illustrated in FIG. 4 consisting of an inner virgin PET layer 20 and an outer overmolded recycled PET layer 30. Thus the final molded preform base includes four equally spaced narrow ribs R1' to R4' of recycled PET spaced approximately 90° from one another. These ribs are separated by large (nearly 90°) pie-shaped sections of virgin PET in the underlying preform layer 20.

These four recycled PET ribs R1' to R4' are designed to be equally spaced at 90° intervals around the base 30E of the preform, whereby the channels C1' to C4' serve as connecting runners from the gate 22' to the preform sidewalls of recycled outer layer 30. An additional benefit is that the channels also serve to increase the flow rate of material from the gate to the recycled outer layer 30, which assists the filling of the outer recycled layer 30 into the mold cavity, which is necessary in order to compensate for the reduction in thickness of the overmolded base portion 20 of the preform compared to a thicker base area of a conventional monolayer preform.

The selection of four channels and/or ribs is exemplary and other numbers of ribs may be utilized without departing from the spirit and scope of the present invention. In addition the selection of a square geometry of the channels is exemplary and other shapes may be chosen as desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of injection molding a multi-layer plastic preform to be blow molded into a container comprising the steps of:

forming an inner layer of a preform of a first plastic material having an open end, sidewalls, and a closed end, said closed end having a plurality of spaced channels on the exterior surface thereof extending from a central area on the closed end to the sidewalls.

providing an overmolding mold cavity defined by sidewalls, an open end for accommodating a core rod, and a closed end with an injection gate therethrough, and a plurality of channels on the interior surface of the closed end communicating with the gate and extending from the gate to the sidewalls;

inserting a core rod and the inner plastic layer of the preform into said overmolding mold cavity with respective channels of the inner plastic layer of the preform and the overmolding mold cavity substantially aligned; and overmolding a second layer of a second plastic material on the inner plastic layer of the preform to form an overmolded multi-layer perform in said overmolding mold cavity by flowing the second plastic material from the gate only through the respective channels to the sidewalls of the overmolding mold cavity thereby limiting the second material in the closed end of the multi-layer preform to regions of the channels, and wherein the first plastic has a higher resistance to stress cracking than the second plastic.

2. The method of claim 1 wherein the first plastic is PET with a given first IV, and the second plastic is PET with a second IV, the first IV being greater than the second IV.

3. The method of claim 1 wherein the first plastic is virgin plastic and the second plastic is recycled plastic.

4. The method of claim 3 wherein both the first and second plastics are PET.

5. The method of claim 4 wherein the first plastic is PET with an IV from about 0.70 to about 0.86 dl/g, and the second plastic is PET with an IV from about 0.63 to about 0.72 dl/g.

6. The method of claim 1 wherein the first plastic is PET and the second plastic is an injection moldable thermoplastic other than PET.

7. The method of any one of claims 1 or 2 to 3 wherein the respective channels in the inner plastic layer of the preform and the overmolding mold cavity are dimensioned to provide laminar flow from the gate to the sidewalls.

8. The method of claim 7 including the further steps of:

removing the overmolded multi-layer preform from the overmolding mold cavity;

providing an additional overmolding mold cavity defined by sidewalls, an open end for accommodating a core rod, and a closed end with an injection gate therethrough;

inserting a core rod and the overmolded multi-layer preform into said additional overmolding mold cavity; and overmolding a third layer of plastic material on the multi-layer preform in the additional overmolding mold cavity.

9. The method of any one of claims 1 or 2 to 7 including the further steps of:

providing an additional overmolding mold cavity defined by sidewalls, an open end for accommodating a core rod, and a closed end with an injection gate therethrough;

inserting a core rod and the overmoleded multi-layer preform into said additional overmolding mold cavity; and overmolding a third layer of plastic material on the multi-layered preform in said additional overmolding mold cavity.

10. The method of any one of claims 1 or 2 to 7 wherein the forming of the inner layer of the plastic preform comprises the steps of:

providing a first mold cavity defined by sidewalls, an open end for accommodating a core rod, and a closed end with an injection gate therethrough, and a plurality of spaced ribs on the interior surface of the closed end and extending from the gate to said sidewalls; and molding the inner plastic layer of the plastic preform in said first mold cavity by injecting a first plastic material through the gate and between the ribs forming said spaced channels in the resulting closed end of the inner plastic layer of the preform.

11. The method of claim 10 wherein the channels on the exterior surface of the closed end of the inner layer of the preform and the channels on the interior surface of the closed end of the overmolding mold cavity are equally spaced on the respective surfaces thereof.

12. The method of claim 11 wherein there are four channels on each surface spaced by about 90°.

13. The method of claim 1 wherein the channels on the exterior surface of the closed end of the inner layer of the preform and the channels on the interior surface of the closed end of the overmolding mold cavity are equally spaced on the respective surfaces thereof.

14. The method of claim 13 wherein there are four channels on each surface spaced by about 90°.

* * * * *